W. A. SHIPPERT.
MILKING MACHINE.
APPLICATION FILED JAN. 26, 1918.

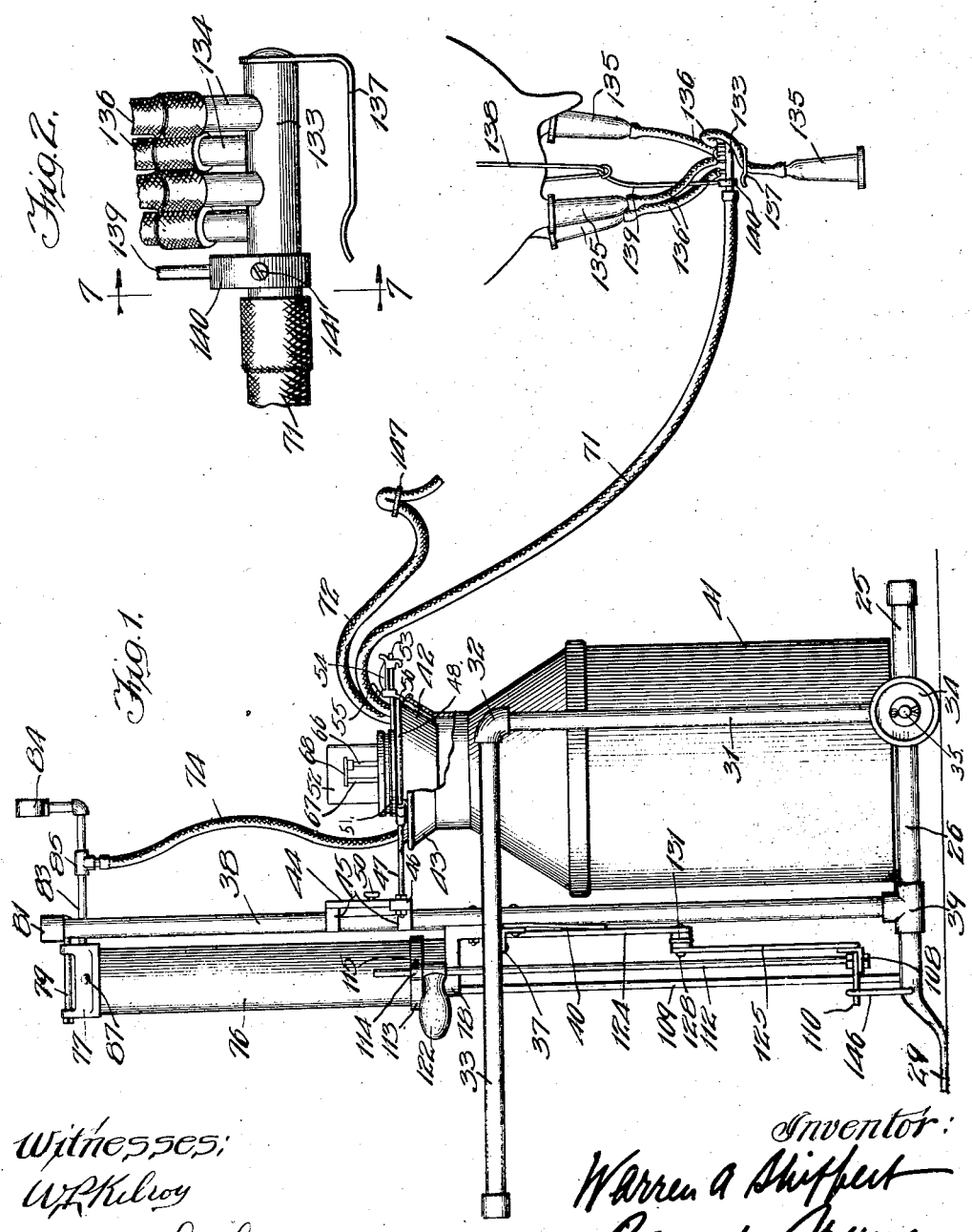

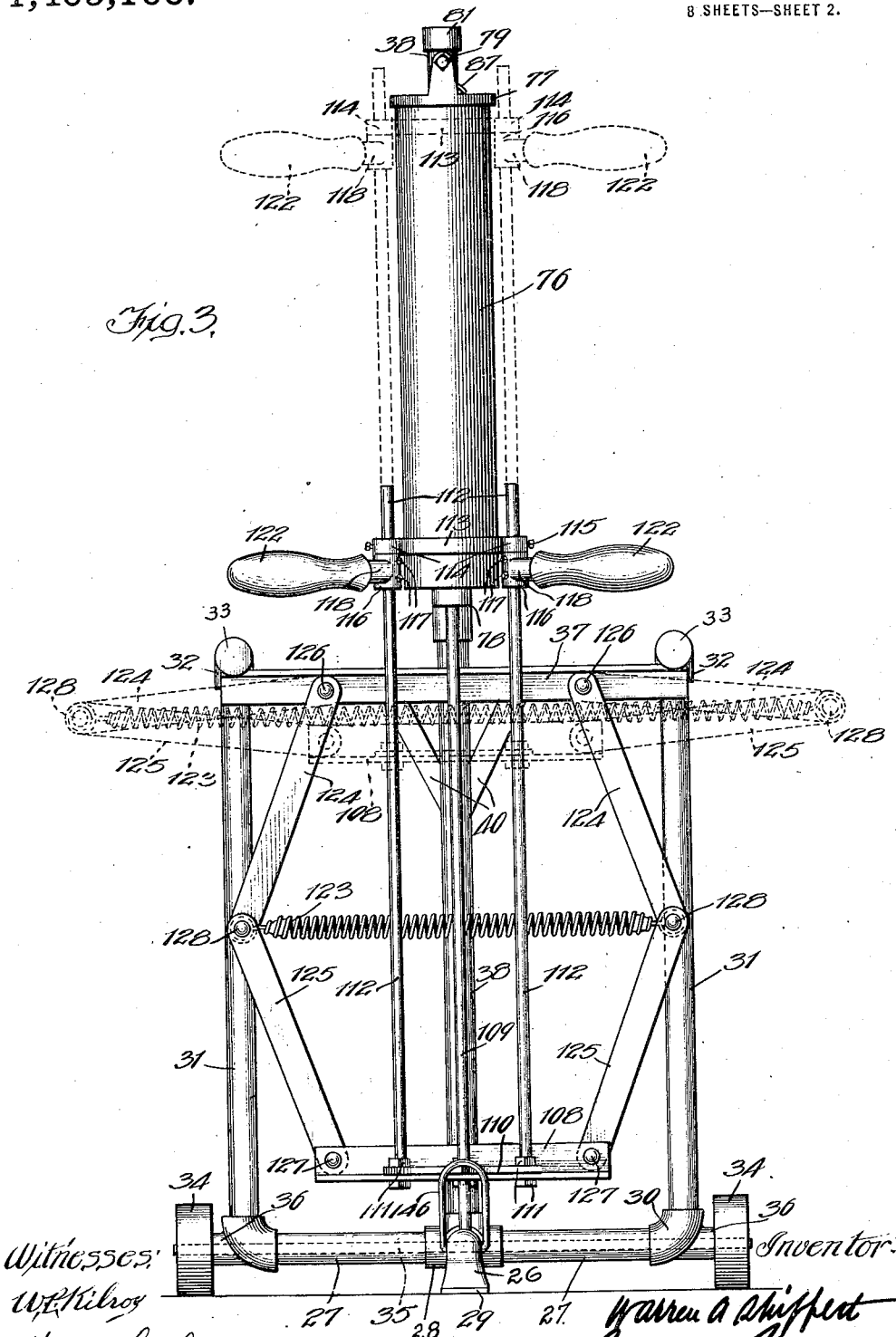

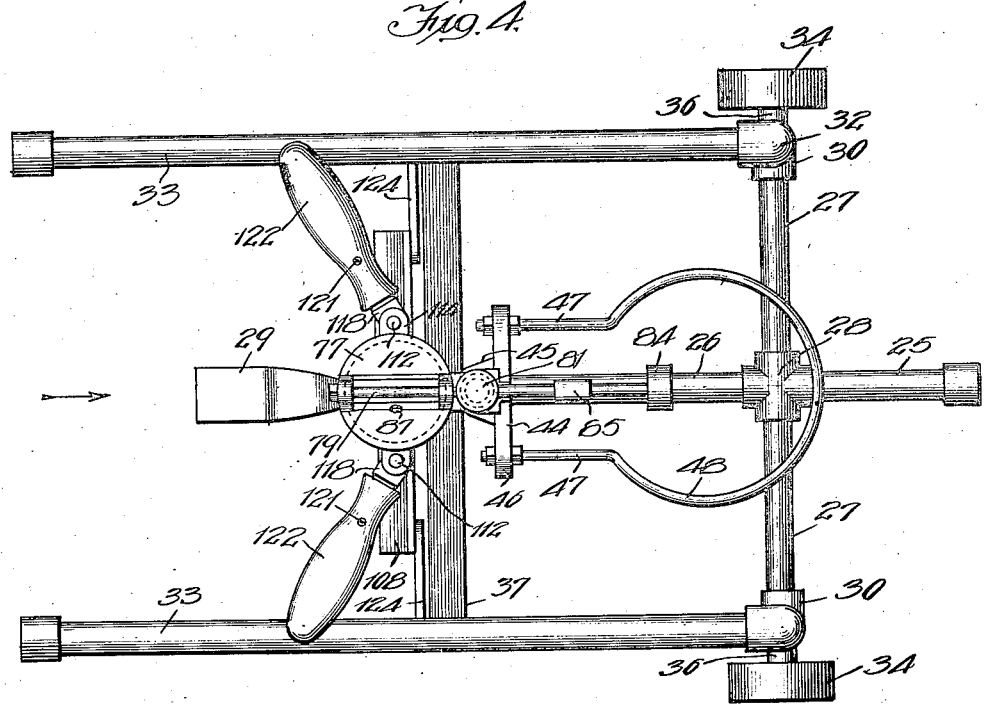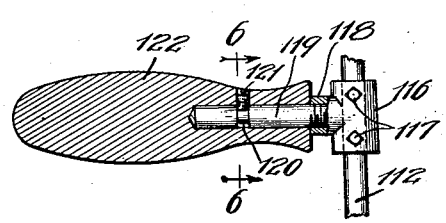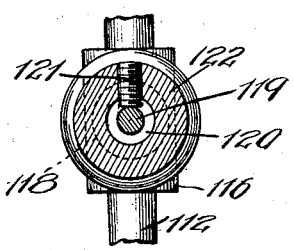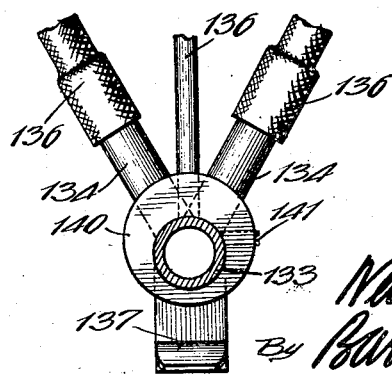

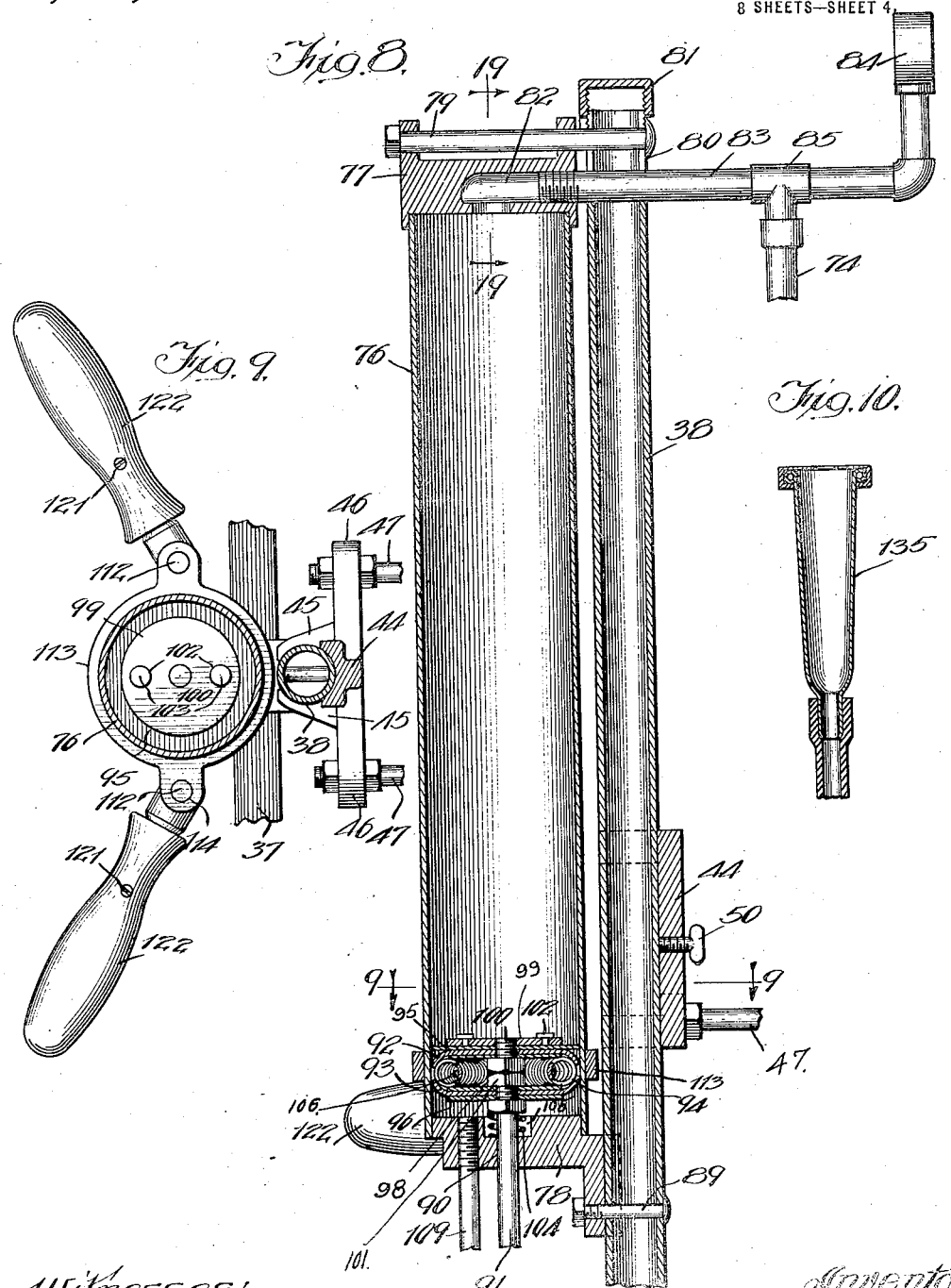

1,405,166.

Patented Jan. 31, 1922.
8 SHEETS—SHEET 5.

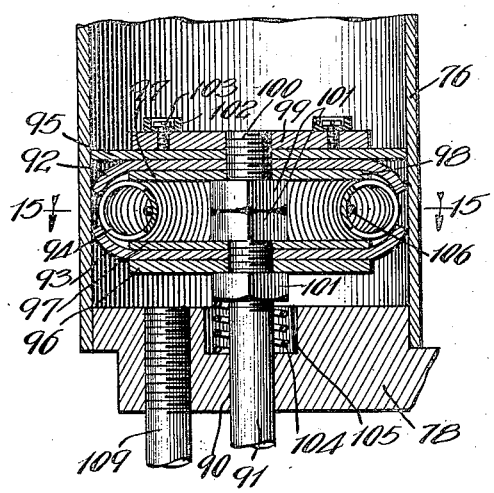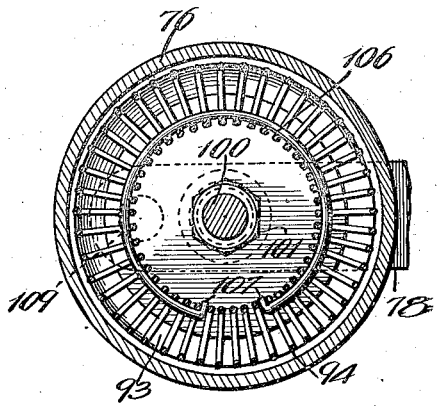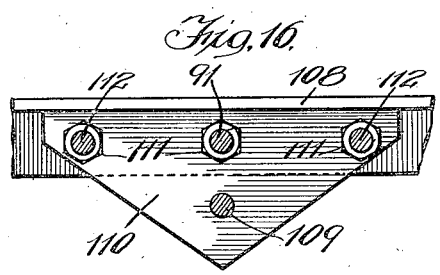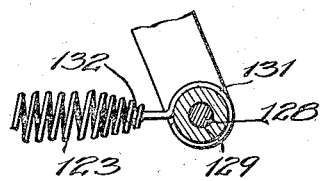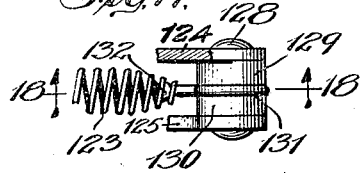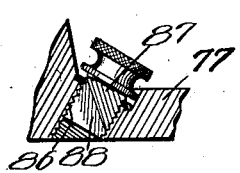

W. A. SHIPPERT.
MILKING MACHINE.
APPLICATION FILED JAN. 26, 1918.

1,405,166.

Patented Jan. 31, 1922.
8 SHEETS—SHEET 7.

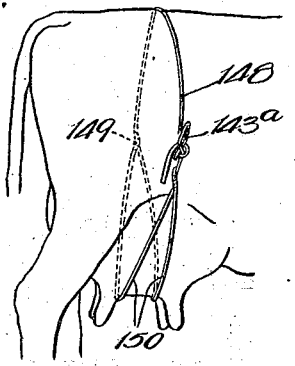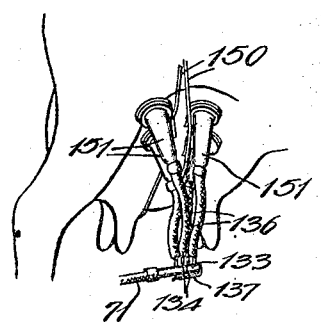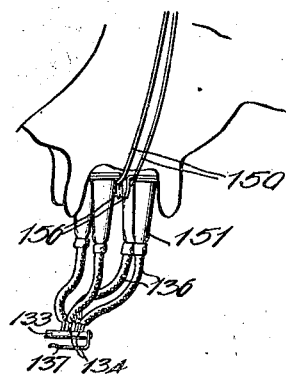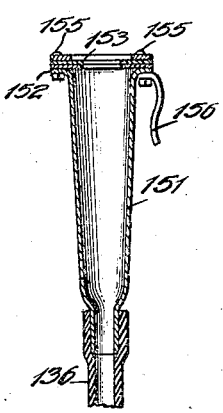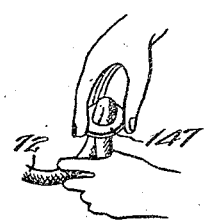

UNITED STATES PATENT OFFICE.

WARREN A. SHIPPERT, OF DIXON, ILLINOIS, ASSIGNOR TO BURTON-PAGE COMPANY, OF CHICAGO, ILLINOIS, A CORPORATION OF ILLINOIS.

MILKING MACHINE.

1,405,166. Specification of Letters Patent. Patented Jan. 31, 1922.

Application filed January 26, 1918. Serial No. 213,855.

*To all whom it may concern:*

Be it known that I, WARREN A. SHIPPERT, a citizen of the United States, residing at Dixon, in the county of Lee and State of Illinois, have invented certain new and useful Improvements in Milking Machines, of which the following is a specification.

My invention relates to cow milking apparatus of the suction type, and more particularly to a milking machine which is operated by hand.

One of the objects of the invention is to provide, in combination with a hand operated pump of variable stroke, certain instrumentalities for receiving the milk from the cow and discharging it into the milk can or other receptacle, whereby the operation of milking may be readily varied and controlled to suit the character of the particular animal. It is well known that some cows are harder to milk than others. Some animals, moreover, are more sensitive and, for one reason or another, require more careful handling. The difficulty with a motor driven milking machine is that it has no convenient means whereby its operation may be adapted to the idiosyncrasies of the different cows milked.

A further object of the invention is to provide a hand operated vacuum pump for milking machines which may be manipulated with a minimum of effort. A further object is to improve the construction of the pump in respect to its piston, particularly, in other respects which will be made apparent.

A further object is to provide a hand milking machine which can be readily moved from place to place; which will hold the milk receptacle firmly in place during the milking operation and when the machine is being moved; and which will consist of a comparatively small number of parts, of simple and strong construction, that may be readily removed from the machine for cleaning or repair.

A further object is to provide, in a milking machine of this type, means whereby the teat cups may be conveniently and quickly put in place on the cow's udder by the milker without assistance from others.

The invention consists in the novel constructions, arrangements and devices to be hereinafter described and claimed for carrying out the above stated objects and such other incidental objects which will appear from the following description.

The invention is illustrated, in a preferred embodiment, in the accommpanying drawings wherein—

Fig. 1 is a side elevation of the device.

Fig. 2 is a fragmentary elevation, on a larger scale, of the udder attachment.

Fig. 3 is a view, in elevation, of the machine looking in the direction indicated by the arrow in Fig. 4;

Fig. 4 is a plan view of the machine with the milk receiving means and certain other parts removed.

Fig. 5 is a sectional view of one of the pump handles and its connections.

Fig. 6 is a sectional view on line 6—6 of Fig. 5.

Fig. 7 is a sectional view on line 7—7 of Fig. 2.

Fig. 8 is a longitudinal sectional view of the pump and associated parts.

Fig. 9 is a cross sectional view on line 9—9 of Fig. 8.

Fig. 10 is a sectional view of one of the teat cups.

Fig 14 is a fragmentary sectional view of the lower end of the pump cylinder showing the piston at the end of the vacuum stroke of the pump.

Fig. 15 is a sectional plan on line 15—15 of Fig. 14.

Fig. 16 is a fragmentary plan view of the cross head forming part of the structure for operating the pump piston.

Fig. 17 is a detail view, in plan section, of the connection between the tension spring and link mechanism forming part of the mechanism for facilitating the operation of the pump.

Fig. 18 is a sectional view on line 18—18 of Fig. 17;

Fig. 19 is a sectional view of the upper cylinder head.

Fig. 20 is a similar view, on an enlarged scale, of the device for providing an adjustable vent for the cylinder.

Fig. 27 is a view showing a modified form of surcingle.

Figs. 28 and 29 are diagrams illustrating the method of applying the teat cups to the cow's udder when the form of surcingle shown in Fig. 27 is used.

Fig. 30 is a diagram illustrating the application of a suitable device for crimping the hose connecting the milking chamber with the udder attachment when it is desired to close the passage in said hose; and Fig. 31 is a sectional view illustrating a modified form of teat cup.

Like characters of reference designate like parts in the several figures of the drawings.

Figure 26:
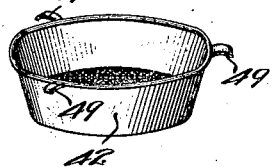
Fig. 26 is a view, in perspective, of the milk strainer which serves also as means for holding the milk receptacle in proper position on the milking machine.

In the preferred embodiment of my invention shown in the drawings, the working parts of the machine are all supported on a supporting structure which is preferably provided with wheels and handles so that it may be moved from place to place. The supporting structure is also provided with means for holding the milk can or other receptacle intended to receive the milk from the cow. In order that this structure should be light, strong and inexpensive to manufacture, it is preferably composed, in a large part, of metal tubing and is constructed as follows: The base consists of longitudinal pipe sections 25, 26, and transverse pipe sections 27, 27 united by a cross 28, pipe section 26 being flattened at 29 for the foot of the milker. At the outer ends of the pipe sections 27 are elbows 30 to which are connected the upright members 31 to the upper ends of which are secured, by elbows 32, horizontally extending pipe sections 33 which provide handles. The supporting structure is provided with rollers 34 on an axle 35 which extends through the sections 27 and elbows 30, the latter being formed with bosses 36 which provide bearings for the axle. The handle members 33 are connected by an angle bar cross piece 37 which is also riveted to the upright tubular member 38 which is connected by a T 39 to the member 26. The structure is preferably reinforced by diagonal braces 40 riveted to angle bar 37 and upright 38. The milk can 41 rests upon the base of the supporting structure just described, and is preferably held in place by means of a strainer 42 (Fig. 26) which enters the neck 43 of the can and is attached to a support adjustably fixed to the upright 38. This support consists of a casting 44 formed with curved ears 45 which extend partially around the upright 38 and with projections 46 (Fig. 9) to which are attached the ends 47 of a ring-like structure 48. The strainer 42 has clips or hooks 49 which engage the ring 48. The support is held in any desired position by set screw 50.

The milk from the cow is drawn into a milk receiving chamber by exhausting the air from said chamber through the instrumentality of a pump. The pump is a vacuum and compression pump and on the return or compression stroke a certain amount of air is forced into the chamber which produces the discharge of the milk into the milk can 41. The means constituting the milk chamber and its connections are preferably constructed in substantial accordance with my Patent No. 1,264,214, issued April 30, 1918, and this device is not claimed herein except in connection with the other instrumentalities constituting the hand-milking machine of my present invention. This device is carried, preferably, on the strainer support just described and consists of a base 51 attached to the support, and a movable inverted cup 52, the latter being preferably made of glass so as to be transparent. The base is provided with a laterally projecting rod 53 on which is a slidable catch 54 having a set screw 55. The catch is formed with a nose piece 56 which extends under the ring 48. On the other side of the base is a pair of hooks 57 to engage the ring. On the base 51 is a rubber disc 58 held in place by a washer 59. The lower edge of the cup 52 bears on the disc 58. The cup is guided in its movements by an annular rubber diaphragm 60 held in place between the upstanding flange 61 of the base and a ring 62 which is angular in cross section and secured to the base by screws 63. Preferably the lower edge of the cup is provided with a stop. I have shown for this purpose a rubber band 64. Milk enters the chamber 65 through an inlet pipe 66. The air is exhausted from the chamber through a pipe 67, the opening in the upper end of which is protected by a shield plate 68 formed with a sleeve 69 whereby it is mounted on pipe 66. Pipe 66 is formed with a nipple 70 for the rubber hose 71 leading from the udder attachment. If the machine is designed for milking two cows at the same time pipe 66 will have another nipple for the rubber hose 72 (Fig. 1) leading from the udder attachment for the other cow. The air pipe 67 is formed with a nipple 73 for a hose 74 which is connected, as will be hereinafter described, to the pump.

When the air in chamber 65 is exhausted on the vacuum stroke of the pump the milk from the cow is drawn into the chamber. On the return or compression stroke of the pump a slight pressure is produced in the chamber which raises cup 52 allowing the milk to flow out from under the lower edge of the cup and pass through openings 75 in the base into the milk receptacle 41.

The pump may be of any desirable construction but is preferably constructed as follows: The pump cylinder 76 is held between an upper head 77 and a lower head 78. The upper head 77 is secured to upright 38 by a bolt 79 which passes through a slot 80 in the upper end of the upright, the bolt being held in position in the slot by a cap 81 on the upright. The head 77 is formed with a duct 82 into which extends a pipe 83 which passes through slot 80 in the upright and is provided at its outer extremity with a vacuum gauge 84. A T 85 interposed between sections of pipe 83 provides a nipple for the hose 74 above referred to. The head 77 is formed with a threaded opening 86 (Figs. 19 and 20) in which is arranged a threaded plug 87 formed with a triangular slit 88. This arrangement provides a minute adjustable vent for the cylinder, the purpose of which will appear.

The lower cylinder head 78 is secured by bolt 89 to the upright 38 and is bored at 90 for the piston rod 91. The piston consists of a pair of leathers, so-called, (which may be made of any suitable tough, flexible material these leathers being shown at 92, 93 Figs. 8 and 14), a spiral spring 94 interposed between the leathers and overlapped by their edges, and preferably, a flat upper leather 95. The leather 93 is held between metal washers 98, 97 and the leathers 92, 95 between washer 98 and a threaded plate 99 which engages the threaded end 100 of the piston rod 91. The parts are held in proper spaced relation by spacing nuts 101. The plate 99 is preferably provided with rubber buffers 102 fastened to the plate by screws 103 and a spring 104 is arranged in a recess 105 in the head 78 so as to bear against the lower spacing nut 101, thereby providing a buffer for the piston on its down stroke. The meeting ends of the spiral spring 94, over which the leathers 92, 93 are lapped, are held together by a stiff wire 106, the ends of which are bent over as indicated at 107 and project between turns of the spring. The piston, as above described, is so constructed that it will not leak even after considerable use.

The piston rod 91 is connected at its lower end to a cross head 108 which is arranged to slide on a rod 109 secured at its upper end of the cylinder head 78 and at its lower end to the frame member 26. This rod passes through a triangular member 110 which is secured to the cross head 108 by the same nuts 111 by means of which there is secured to the cross head the piston rod 91 and a pair of additional rods 112 by means of which the cross head is reciprocated. These rods 112 are connected at their upper end by a ring 113 which surrounds cylinder 76, the ring being provided with ears 114 through which rods 112 pass and to which the rods are secured by set screws 115. Secured to the rods 112 are a pair of handles which may be adjusted angularly and also vertically on the rods. On each rod is a sleeve 116 adapted to be secured to the rod by set screws 117 and formed with a threaded boss 118 for a stud 119, the latter having a circumferential channel 120 into which projects the end of a screw 121 set into the hand grip 122. This arrangement allows the hand grips to be turned. The handles are arranged ordinarily below ring 113 but, if desired, in case the operator is a tall man, for example, the ring may be removed and the handles placed on the projecting ends of rods 112 above the ring.

In the ordinary operation of a pump of this character the force necessary for creating the vacuum will necessarily increase as the intensity of the vacuum increases, that is to say, toward the end of the down stroke of the pump. In order to make the pump more easy of manipulation I preferably provide a link and spring mechanism arranged between the supporting structure of the machine and the piston rod cross head 108 and constructed so that spring pressure is brought to bear against the cross head on the vacuum stroke which gradually increases as the downward movement of the piston proceeds. The spring is stressed on the up stroke of the pump, during which, of course, the piston moves more freely, to bring about the spring pressure brought into play to assist the operator in the down or vacuum stroke of the piston. In this way there is a distribution or balancing of forces which besides making the pump operation an easy one for the milker, gives the pump a smoother action than it would otherwise have.

The cross head 108 is connected with the stationary transverse frame member 37 by a pair of jointed links connected at their joints by a spiral spring 123. Each of these jointed links is made up of two members 124, 125, pivoted, respectively, to frame member 37 at 126 and to cross head 108 at 127, and pivoted to each other by means of a pintle 128 in the form of a rivet which extends through the members 124 and 125 and through a spacing sleeve 129 (Figs. 17 and 18). The spacing sleeve is formed with a groove 130 for a hook 131. The end of the hook is provided with a ball 132 and the terminal loops of the spring 123 are diminished in their diameter so that in effect a socket is provided engaging the ball 132. By this device the connections between the ends of spring 123 and the jointed links are, in effect, universal connections allowing the links to flex readily without disturbing the position of the spring except to expand it or contract it, as the case may be.

In Fig. 3 the lower position of the reciprocating structure to which the piston is attached and the corresponding position of the jointed links and spring are shown in full lines. The upper position of these parts is indicated in dotted lines. As the handles are raised from their full line position to the dotted line position, this occurring on the compression or back stroke of the pump, the spring 123 is stretched. On the vacuum or down stroke, which is the stroke requiring the most force, the operator is materially assisted by the force exerted by the spring which is augmented due to increased leverage as the piston proceeds with its downward stroke.

The udder attachment will next be described in the preferred form shown in the drawings. This device comprises a tubular member 133 provided with nipples 134 preferably arranged in pairs at an angle to each other, and a corresponding number of teat cups 135 connected to the nipples by rubber hose sections 136. The teat cups may be of any preferred construction. The tubular member 133 is preferably provided on its under side with a spring clip 137 adapted to engage one of the rubber hose sections 136, in case its teat cup is not used, so as to crimp the hose section in question and prevent leakage of air.

Figure 11:
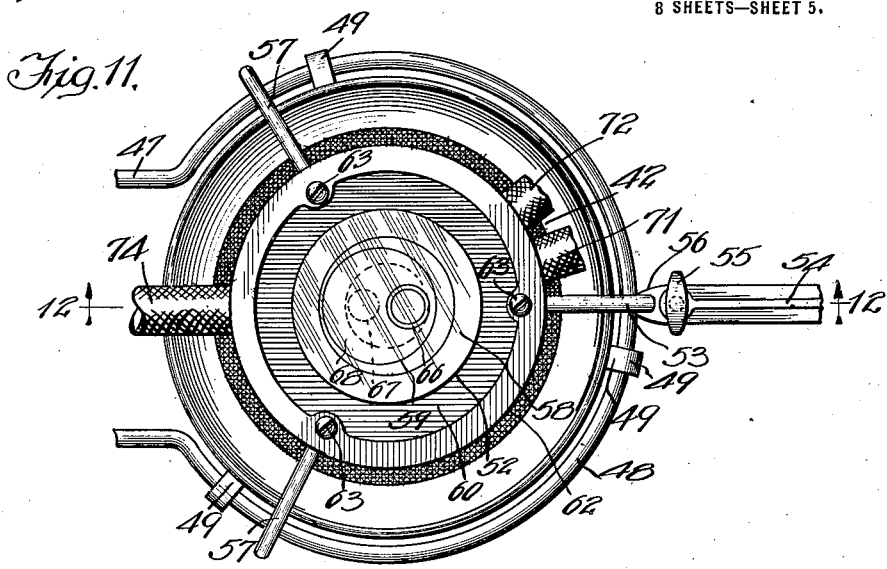
Fig. 11 is a plan view of the means constituting the milk receiving chamber.
Figure 12:
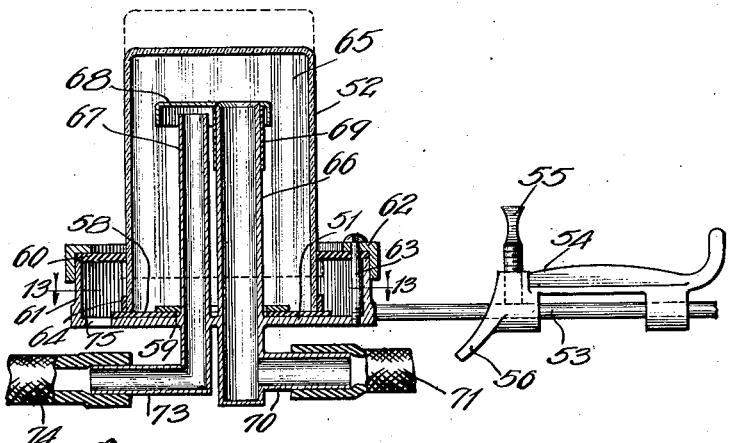
Fig. 12 is a vertical sectional view on line 12—12 of Fig. 11.
Figure 13:
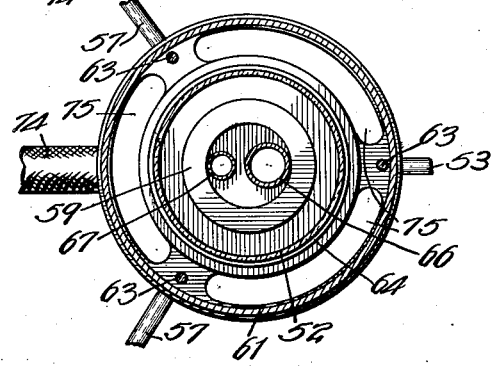
Fig. 13 is a sectional plan on line 13—13 of Fig. 12.
Figure 21:
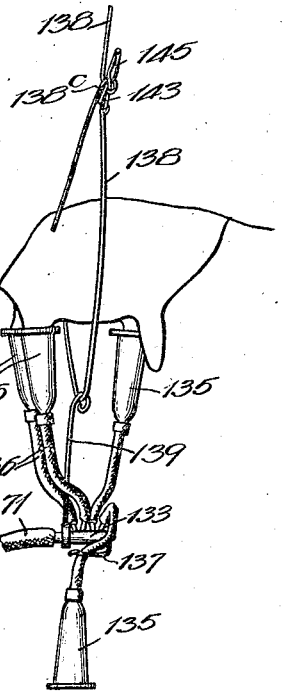
Fig. 21 is a view showing the udder attachment as applied to the cow.
Figure 22:
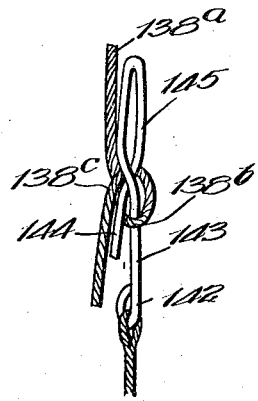
Fig. 22 is a detail view of a preferred form of catch for the udder attachment surcingle.

The tubular element is also provided, preferably, with means by which it may be supported on a surcingle 138. This means consists of a hook 139 engaged with a ring 140 held to the member 133 by set screw 141. The ring is arranged at the inner end of the tubular member so that there is a balance between the weight of the hose 71, which connects the udder attachment with the milk receiving chamber, and the weight of the teat cups and their connecting hose. The surcingle is attached at one end to a loop 142 on the end of a bent wire catch 143 (Fig. 22). The other end of the surcingle, indicated at 138ª, passes over the back of the cow between the looped end of the catch and its other end 144, as indicated at 138ᵇ, and then upwardly and between the upper portion of the catch which is in the form of a loop 145 and the surcingle section 138ª, as indicated at 138ᶜ. This arrangement is more convenient for adjustment than a buckle would be.

Figure 23:
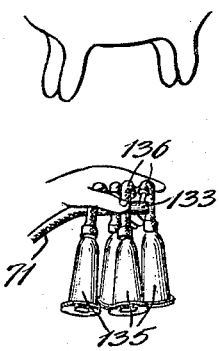
Figs. 23, 24 and 25 are diagrams illustrating the method of applying the teat cups to the cow's udder.
Figure 24:
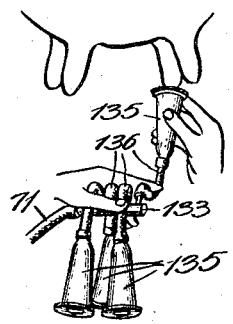
Figure 25:
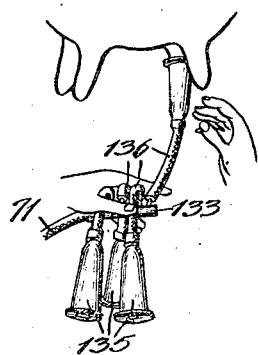

The pump is provided with means for holding the piston at the end of its vacuum stroke so that the milker may let go of the pump handles and adjust the udder attachment to the cow while a vacuum is maintained in the milking apparatus. To make possible this operation, which is a matter of considerable importance in order that the milking machine may be used conveniently and expeditiously by a single operator, a U-shaped latch 146 is pivoted to the frame member 26 near the foot piece 29. This latch may be raised by the operator's foot so as to engage the triangular plate 110 on the cross head 108. The pump is given its down stroke to produce a vacuum with one hand while the milker holds the udder attachment in his other hand with the teat cup hose bent over to prevent ingress of air, as shown in Fig. 23. He then latches the cross head of the piston in its lower position by means of latch 146 and goes to the cow with the udder attachment still held in his hand, as above described. If a surcingle is used the hook on the udder attachment is engaged with the surcingle and the surcingle adjusted, if necessary, by manipulation of catch 143, all of which may be done with the one hand. The teat cups are then placed on the teats of the cow one by one. This operation is easy and may be accomplished with one hand because of the vacuum maintained by the pump. With the pump properly constructed the vacuum will last long enough to attach all of the teat cups without difficulty. When the teat cups have been adjusted they will remain in position even though the vacuum is dissipated.

The milking vacuum for the ordinary cow will be in the neighborhood of fifteen inches, measured on a mercury scale. The pump is preferably constructed so that it will produce a considerably greater vacuum than this, for example, it may be constructed so as to give a vacuum of twenty inches. The operator may vary the intensity of the suction applied to any particular animal by varying the length of the down stroke of the pump. He can manipulate the pump while watching the animal or animals he is milking and while observing the milk flow through the cup 52 which is preferably made of glass. The machine is also provided with the vacuum gauge 84 for guiding the operator. With a little practice the milking operation will have all the flexibility of milking by hand.

The operator can, as stated, observe the flow of milk into the milk receiving chamber 54. This enables him to hold the pump down at the proper point until a normal milk flow results. The point at which the down stroke of the pump is to cease will depend in a large measure upon the peculiarities of the particular animal, which will be known to the operator; but in addition to this the operator will be guided by the intensity of vacuum produced as shown by the vacuum gauge, so that the length of stroke can be varied, if necessary, in accordance with the conditions of the pump and the other air connections of the apparatus. When the milk has risen to the proper height in the milk chamber 65 the piston is raised and this produces a pressure in the milk chamber which may be adjusted by turning the screw plug 87 controlling the air vent in the upper cylinder head. The air pressure in the milk receiving chamber raises the cup from its seat so that the milk is discharged into the milk can 41.

When two cows are to be milked it is necessary to crimp one of the connections from the milk receiving chamber to the udder attachment for one cow while the other udder attachment is being adjusted to the other cow. This is accomplished by the loop 147, which as shown in Fig. 1, crimps hose 72. After the udder attachment connected with hose 71 has been adjusted to one of the cows, the loop 147 may be taken from hose 72 and the udder attachment connected to that hose applied to another cow. If necessary the pump may be manipulated between these operations to re-establish the vacuum which may have become dissipated.

In Figs. 27, 28 and 29, I have shown a modified form of surcingle which consists preferably of a rope or cord 148, one end of which is folded upon itself, and spliced to the rope or cord as indicated at 149 (Fig. 27), so as to provide spaced supporting strand 150. The other end of this surcingle is preferably looped around the catch 143ª in substantially the same manner as described in connection with Fig. 22. The surcingle is preferably girded about the body of the animal so that the spaced strands 150 will be in contact with the udder of the cow. The teat cups are then applied to the position indicated in Fig. 28, after which they may be moved to the position indicated in Fig. 29. When the teat cups are in the position indicated in Fig. 29, the teats may be partly inserted into their respective cups by the operator. The vacuum pump may then be operated in the manner previously described to create a vacuum which will draw the teats further into the cups.

In Fig. 31 I have shown a modified form of teat cup which consists of a tubular member 151 which is flared at its upper end to provide a flange 152, 153, 153 designate rubber diaphragms which may be clamped against the flange 152 by means of the ring 154 and the screws 155. 156 designates a hook secured to the flange 152 adapted to support the cups in operative position on the surcingle.

I claim:

1. In a milking machine, the combination with a hand operated vacuum pump, having a working element and teat cups having a connection with the pump through which suction is applied to the cow's udder; of means for holding the working element of the pump in fixed position after a vacuum has been established, thereby maintaining the vacuum in the teat cups while the cups are being applied to the cow.

2. In a milking machine, the combination with a hand operated vacuum pump having a reciprocating element and teat cups having connections through which suction is applied to the cow's udder; of means for holding the reciprocating element in fixed position at the end of its vacuum stroke for the purpose described.

3. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said milk receiving chamber and means for gradually creating a partial vacuum in said chamber, conduit and cups comprising a vacuum pump consisting of a cylinder, a piston, and a piston rod extending through the lower end of the cylinder, a support for the cylinder, a conduit leading from the upper end of the cylinder to said milk receiving chamber, a cross head to which the piston rod is attached, means whereby the operator of the machine may impart movements to the cross head, a pair of jointed links connected at opposite ends to the support and to said cross head respectively, and a spring connecting said links at their joints, whereby the length of the stroke of the pump may be varied by the operator to vary the intensity of each suction impulse applied to the cow's udder.

4. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said milk receiving chamber and means for gradually creating a partial vacuum in said chamber, conduit and cups comprising a vacuum pump consisting of a cylinder, a piston and a piston rod extending through the lower end of the cylinder, a support for the cylinder, a conduit leading from the upper end of the cylinder to said milk receiving chamber, a cross head to which the piston rod is attached, means whereby the operator of the machine may impart movements to the cross head, a pair of jointed links connected at opposite ends to the support and to said cross head respectively, a spring connecting said links at their joints, and a guide rod on which said cross head is slidable, whereby the length of the stroke of the pump may be varied by the operator to vary the intensity of each suction impulse applied to the cow's udder.

5. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said milk receiving chamber and means for gradually creating a partial vacuum in said chamber, conduit and cups comprising a vacuum pump consisting of a cylinder, a piston, and a piston rod extending through the lower end of the cylinder, a support for the cylinder, a conduit leading from the upper end of the cylinder to said milk receiving chamber, a cross head to which the piston rod is attached, means whereby the operator of the machine may impart movements to the cross head, a pair of jointed links connected at opposite ends to the support and to said cross head respectively, a spring connecting said links at their joint, a guide rod on which said cross head is slidable, a ring slidable on said cylinder, rods connecting the ring with the crosshead, and handles on said rods, whereby the length of the stroke of the pump may be varied by the operator to vary the intensity of each suction impulse applied to the cow's udder.

6. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said milk receiving chamber and means for gradually creating a partial vacuum in said chamber, conduit and cups comprising a vacuum pump consisting of a cylinder, a piston, and a piston rod extending through the lower end of the cylinder, a support for the cylinder, a conduit leading from the upper end of the cylinder to said milk receiving chamber, a cross head to which the piston rod is attached, means whereby the operator of the machine may impart movements to the cross head, a pair of jointed links connected at opposite ends to the support and to said cross head respectively, a spring connecting said links at their joints, and means for holding said cross head in a fixed position at the lower end of the stroke of the piston, whereby the length of the stroke of the pump may be varied by the operator to vary the intensity of each suction impulse applied to the cow's udder.

7. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said milk receiving chamber and means for gradually creating a partial vacuum in said chamber, conduit and cups comprising a vacuum pump consisting of a cylinder, a piston and a piston rod extending through the lower end of the cylinder, a support for the cylinder, a conduit leading from the upper end of the cylinder to said milk receiving chamber, a cross head to which the piston rod is attached, a ring slidably arranged on the cylinder, rods connecting said cross head and ring and handles on said rods, whereby the length of the stroke of the pump may be varied by the operator to vary the intensity of each suction impulse applied to the cow's udder.

8. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said milk receiving chamber and means for gradually creating a partial vacuum in said chamber, conduit and cups comprising a vacuum pump consisting of a cylinder, a piston, and a piston rod extending through the lower end of the cylinder, a support for the cylinder, a conduit leading from the upper end of the cylinder to said milk receiving chamber, a cross head to which the piston rod is attached, a ring slidably arranged on the cylinder, rods connecting said cross head and ring, and handles adjustable vertically and angularly on said rods, whereby the length of the stroke of the pump may be varied by the operator to vary the intensity of each suction impulse applied to the cow's udder.

9. A milking machine of the type operating to withdraw milk from the cow by suction and to discharge the same to a receptacle at atmospheric pressure comprising in combination a milk receiving chamber adapted to be associated with said receptacle, a cluster of teat cups, a flexible conduit through which the milk passes from the teat cups to said milk receiving chamber and means for gradually creating a partial vacuum in said chamber, conduit and cups comprising a vacuum pump consisting of a cylinder, a piston, and a piston rod extending through the lower end of the cylinder, a support for the cylinder, a conduit leading from the upper end of the cylinder to said milk receiving chamber, a cross head to which the cylinder rod is attached, a ring slidably arranged on the cylinder, rods connecting said cross head and ring, handles on said rods, and a guide rod on which said cross head is slidable, whereby the length of the stroke of the pump may be varied by the operator to vary the intensity of each suction impulse applied to the cow's udder.

10. In a milking machine, the combination of a supporting structure having a base to sustain a milk receptacle, and an upright member, a pump on said supporting structure, an udder attachment, milk receiving means having connections to said pump and udder attachment, a support for the milk receiving means adapted to be fixed adjustably to said upright member, and a strainer connected with said support adapted to fit into the milk receptacle to hold the same in place on said supporting structure.

11. In a milking machine, the combination of a supporting structure having a base to sustain a milk receptacle and an upright member, a pump on said supporting structure, an udder attachment, milk receiving means having connections to said pump and udder attachment, a support fixed adjustably to said upright member, and a strainer connected with said support adapted to fit into the milk receptacle to hold the same in place on said supporting structure.

12. In a milking machine, the combination of a supporting structure adapted to sustain a milk receptacle, a pump thereon, an udder attachment, milk receiving means having connections with the pump and udder attachment, a ring adjustably attached to said supporting structure, a strainer adapted to fit into the milk receptacle and having means for sustaining it on said ring, means on the milk receiving means for engagement with said ring, and a slidable catch associated with said milk receiving means which engages with said ring.

13. In a milking machine, the combination of a wheeled supporting structure adapted to sustain a milk receptacle, a hand operated pump on said structure, an udder attachment, means providing a milk receiving chamber connected with said pump and udder attachment, a device engageable with said supporting structure for holding said milk receiving means in place over the milk receptacle, and handles on said supporting structure.

14. In a milking machine, the combination of a pump and udder attachment, means providing a milk receiving chamber connected with said pump and udder attachment, a supporting structure comprising a base having wheels at the forward end and a foot piece at the other end and adapted to hold a milk receptacle, an upright member to which the pump is secured, a support on said upright member which holds the milk receiving chamber over said milk receptacle, said supporting structure being provided with horizontal frame members which project backwardly to provide handles.

15. In a milking machine, the combination of a hand operated vacuum pump, an udder attachment and means comprising a hose for putting said udder attachment in communication with the pump; said attachment comprising a tubular member secured to said hose and formed with nipples projecting therefrom, teat cups, hose sections connecting said cups with said nipples, and a clip on the under side of said tubular member to which the hose sections may be engaged so as to crimp them to prevent ingress of air.

16. In a milking machine, the combination of a vacuum pump, an udder attachment and means comprising a hose for putting said udder attachment in communication with the pump; said attachment comprising a tubular member secured to said hose and formed with nipples projecting therefrom, teat cups, hose sections connecting said cups with said nipples, and means associated with said tubular member adapted to engage a surcingle.

17. In a milking machine, the combination of a supporting structure, a vacuum pump comprising a cylinder and a piston, an udder attachment, means constituting a milk receiving chamber, and pipe connections between the chamber and the udder attachment and pump, respectively, the latter connection opening from the end of the cylinder remote from the position of the piston at the end of the vacuum stroke of the pump, said cylinder being provided at the aforesaid end with means constituting a vent of adjustable size.

18. In a milking machine, the combination of a supporting structure, a substantially vertical pump cylinder thereon, a piston in said cylinder movable downwardly at the vacuum stroke of the pump, an udder attachment, means constituting a milk receiving chamber having connections with the udder attachment and the upper end of said cylinder, respectively: the upper end of said cylinder being formed with a threaded opening, and a threaded, longitudinally slit plug in said opening to provide an adjustable vent for the cylinder.

19. In a milking machine, the combination with a vacuum pump, of teat cups having a connection with the pump through which suction is applied to the cow's udder, and a surcingle for supporting said teat cups comprising a flexible member folded upon itself to provide two supporting strands adjacent the cow's udder.

20. In a milking machine, the combination with a vacuum pump, of teat cups having a connection with the pump through which suction is applied to the cow's udder, and a surcingle for supporting said teat cups comprising a flexible member folded upon itself to provide two supporting strands adjacent the cow's udder, said teat cups being provided with hooks adapted to support said cups on said surcingle.

21. A teat cup comprising a tubular member formed with a flange, a plurality of flexible diaphragms adapted to be clamped against said flange, and a hook secured to said tubular member adapted to hold the same in operative position on the cow's udder.

22. A milking machine of the type operating to withdraw milk from the cow by suction and to discharge the same to a receptacle at atmospheric pressure, comprising in combination a milk receiving chamber adapted to be associated with said receptacle, a cluster of teat cups, a valveless, flexible conduit through which the milk passes unobstructedly from the teat cups to said milk receiving chamber and means for gradually creating a partial vacuum in said chamber, conduit and cups, comprising a pump consisting of piston and cylinder members one of which is movable with respect to the other and is provided with means for operating it by hand whereby the length of its stroke may be varied by the operator to vary the intensity of each suction impulse applied to the cow's udder.

23. In a milking machine, the combination with teat cups and teat cup connections; of apparatus for exhausting the air from said connections and cups in recurring pulsations, comprising a transparent milk receiving chamber, and an exhaust pump manipulated by the operator thereby permitting variations in the length and rapidity of the strokes.

24. In a milking machine, the combination with teat cups and teat cup connections; of apparatus for exhausting the air from said connections and cups in recurring pulsations, comprising a transparent milk receiving chamber, and an exhaust pump which produces suction on the down stroke and which is manipulated by the operator thereby permitting variations in the length and rapidity of the strokes.

25. In a milking machine, the combination with teat cups and teat cup connections; of apparatus for exhausting the air from said connections and cups in recurring pulsations, comprising a transparent milk receiving chamber and an exhaust pump which produces suction on the down stroke and which is operated by hand thereby permitting variations in the length and rapidity of the stroke.

26. In a milking machine, the combination with an udder attachment and a vacuum pump to produce an exhaust therein having a reciprocating element, of mechanism automatically brought into play on the vacuum stroke of the pump for exerting a force upon the reciprocating element in the direction to assist said stroke.

27. In a milking machine, the combination with an udder attachment and a vacuum pump to produce an exhaust therein having a reciprocating element, of mechanism automatically brought into play on the vacuum stroke of the pump for exerting a force upon the reciprocating element in the direction to assist said stroke, comprising a spring which is stressed on the return stroke of the pump.

28. In a milking machine, the combination with an udder attachment and a vacuum pump to produce an exhaust therein having a reciprocating element and a support for the same, of a link mechanism connected with said reciprocating element and support, and a spring connected with said link mechanism so that it is put under stress on the return stroke of the pump to exert a force upon the reciprocating element on its vacuum stroke.

29. In a milking machine, the combination with an udder attachment and a vacuum pump to produce an exhaust therein, having a reciprocating element and a support for the same, of a pair of jointed links connected at opposite ends to said support and reciprocating element respectively, and a spring arranged between and connected to the links at their joints.

30. In a milking machine, the combination with a vacuum pump comprising a cylinder, a piston and a piston rod extending through the lower end of the cylinder; of a support for the cylinder, an udder attachment, a milk receiving chamber, pipes leading thereto from the upper end of the cylinder and from the udder attachment, a cross head to which the piston rod is attached; a pair of jointed links connected at opposite ends to the support and to said cross head, respectively; and a spring connecting said links at their joints.

31. In a milking machine, the combination with a vacuum pump comprising a cylinder, a piston, and a piston rod extending through the lower end of the cylinder; of a support for the cylinder; an udder attachment, a milk receiving chamber; pipes leading thereto from the upper end of the cylinder and from the udder attachment; a cross head to which the piston rod is attached; a pair of jointed links connected at opposite ends to the support and to said cross head, respectively; a spring connecting said links at their joints, and a guide rod on which said cross head is slidable.

32. In a milking machine, the combination with a vacuum pump comprising a cylinder, a piston, and a piston rod extending through the lower end of the cylinder; of a support for the cylinder, an udder attachment, a milk receiving chamber; pipes leading thereto from the upper end of the cylinder and from the udder attachment; a cross head to which the piston rod is attached; a pair of jointed links connected at opposite ends to the support and to said cross head, respectively; a spring connecting said links at their joints; a guide rod on which said cross head is slidable, a ring slidable on said cylinder; rods connecting the ring with the cross head; and handles on said rods.

33. In a milking machine, the combination with a vacuum pump comprising a cylinder, a piston, and a piston rod extending through the lower end of the cylinder; of a support for the cylinder, an udder attachment, a milk receiving chamber; pipes leading thereto from the upper end of the cylinder and from the udder attachment; a cross head to which the piston rod is attached; a pair of jointed links connected at opposite ends to the support and to said cross head, respectively; a spring connecting said links at their joints; and means for holding said cross head in a fixed position at the lower end of the stroke of the piston.

34. In a milking machine, the combination with a vacuum pump comprising a cylinder, a piston, and a piston rod extending through the lower end of the cylinder; of a support for the cylinder; an udder attachment, a milk receiving chamber; pipes leading thereto from the upper end of the cylinder and from the udder attachment; a cross head to which the piston rod is attached; a ring slidably arranged on the cylinder; rods connecting said cross head and ring; and handles on said rods.

35. In a milking machine, the combination with a vacuum pump comprising a cylinder, a piston and a piston rod extending through the lower end of the cylinder; of a support for the cylinder, an udder attachment; a milk receiving chamber; pipes leading thereto from the upper end of the cylinder and from the udder attachment; a cross head to which the piston rod is attached; a ring slidably arranged on the cylinder; rods connecting said cross head and ring; and handles adjustable vertically and angularly on said rods.

36. In a milking machine, the combination with a vacuum pump comprising a cylinder, a piston and a piston rod extending through the lower end of the cylinder; of a support for the cylinder, an udder attachment; a milk receiving chamber; pipes leading thereto from the upper end of the cylinder and from the udder attachment; a cross head to which the piston rod is attached; a ring slidably arranged on the cylinder; rods connecting said cross head and ring; handles on said rods; and a guide rod on which said cross head is slidable.

37. In a milking machine, the combination of an udder attachment, a support, a pump to produce an exhaust in the udder attachment comprising a reciprocating element and an element fixed to the support, a pair of jointed links pivoted to the support and to said reciprocating element, and a spring arranged between and engaged with said links at their joints by universal connections.

38. In a milking machine, the combination of an udder attachment, a support, a pump to produce exhaust in the udder attachment comprising a reciprocating element and an element fixed to said support, a pair of jointed links pivoted to said support and to said reciprocating element, each link composed of a pair of members, a pintle connecting the same and a sleeve surrounding said pintle, hooks engaging said sleeves formed with balls at their inner ends, and a coiled spring, the end turns of which are of diminished diameter so as to engage said balls as sockets.

39. In a milking machine, the combination of an udder attachment, a supporting structure, a vacuum pump to produce an exhaust in the udder attachment comprising a cylinder, a piston in said cylinder, a reciprocating structure to which the piston is attached, means for guiding said reciprocating structure, and a pair of handles adjustable angularly and vertically on said reciprocating structure provided with loose, revoluble grips.

40. In a milking machine, the combination of an udder attachment, a supporting structure, a vacuum pump to produce an exhaust in the udder attachment comprising a cylinder and a piston, a reciprocating structure to which the piston is attached, means for guiding said reciprocating structure comprising a ring surrounding said cylinder and guides on said supporting structure, and a pair of handles on said reciprocating structure.

WARREN A. SHIPPERT.